No. 716,912. Patented Dec. 30, 1902.
J. MACPHAIL.
HARROW TOOTH AND MEANS FOR SUPPORTING SAME.
(Application filed Apr. 22, 1901.)
(No Model.)

Witnesses
J. B. Weir
Ira D. Perry

Inventor
James Macphail
By Brown & Darby
Attys

THE NORRIS PETERS CO., PHOTO-LITHO., WASHINGTON, D. C.

UNITED STATES PATENT OFFICE.

JAMES MACPHAIL, OF BLUE ISLAND, ILLINOIS.

HARROW-TOOTH AND MEANS FOR SUPPORTING SAME.

SPECIFICATION forming part of Letters Patent No. 716,912, dated December 30, 1902.

Application filed April 22, 1901. Serial No. 57,012. (No model.)

*To all whom it may concern:*

Be it known that I, JAMES MACPHAIL, a citizen of the United States, residing at Blue Island, in the county of Cook and State of Illinois, have invented a new and useful Harrow-Tooth and Means for Supporting the Same, of which the following is a specification.

This invention relates to harrow-teeth and means for supporting the same.

The object of the invention is to provide an efficient construction and arrangement for securing and supporting harrow-teeth.

Other objects of the invention will appear more fully hereinafter.

The invention consists substantially in the construction, combination, location, and arrangement of parts, all as will be more fully hereinafter set forth, as shown in the accompanying drawings, and finally pointed out in the appended claims.

Figure 1:
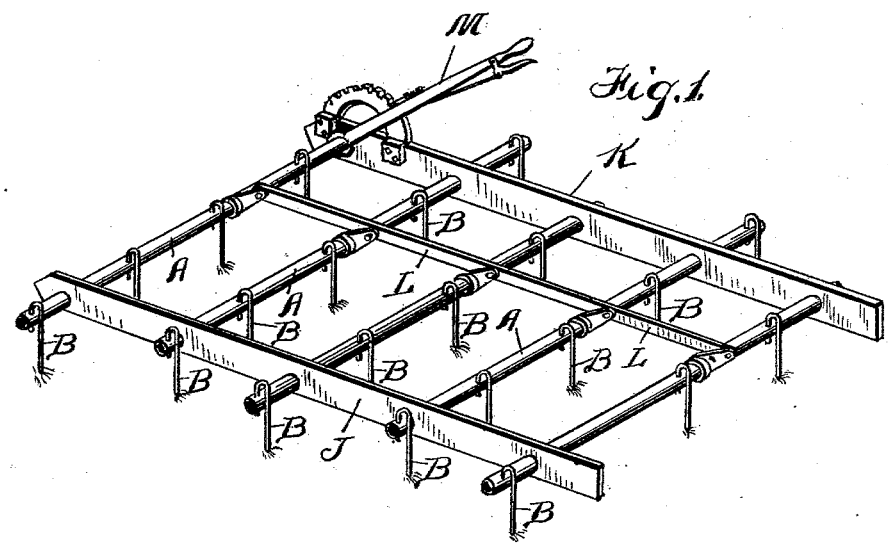
Figure 2:
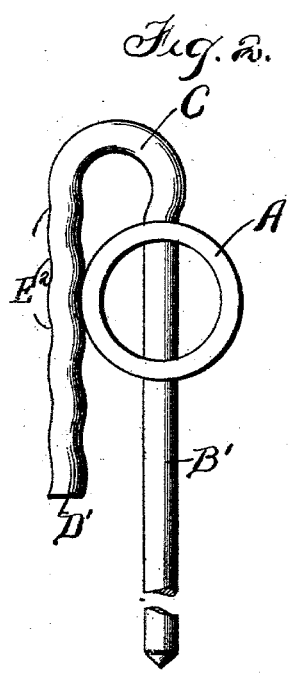
Figure 3:
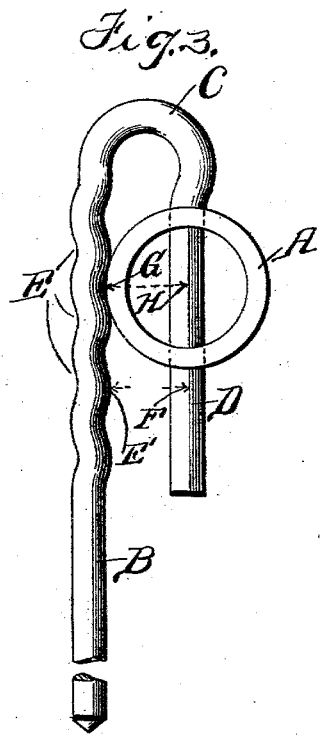

Referring to the accompanying drawings and to the various views and reference-signs appearing thereon, Figure 1 is a view in perspective of a harrow embodying in its construction the features of my invention. Fig. 2 is an end view of a harrow-tooth-supporting rod or pipe, showing means for fastening the harrow-tooth thereon. Fig. 3 is a view similar to Fig. 2, showing a modified arrangement embodying the principles of my invention.

The same part is designated by the same reference-sign wherever it occurs throughout the several views.

In the drawings reference-sign A designates a supporting rod or pipe, which may be of any suitable or convenient construction and material. In the form shown the support comprises a section of pipe or tube, but it is obvious that the invention is not to be limited to the tubular form or cross-sectional shape of the support. The support is provided with openings transversely therethrough.

Referring to Fig. 3, the harrow-tooth B is provided with a bend C therein adjacent to one end thereof to form a bent portion D, the portion D being bent back and into substantially parallel relation with the stem or operating part of the tooth and designed to be inserted or driven into the openings formed transversely through the support A, as above set forth. The main stem or body of the tooth, from the bend C therein toward the operating point or end of said tooth, is provided with one or more bends or corrugations E therein for a portion of the length thereof, which are arranged on radii substantially corresponding to an exterior radius of the support A in order to approximately conform to the exterior contour of said support. It is obvious that when the support A is of other than cylindrical cross-sectional shape the bends or corrugations E should be of similar curves or shape to conform to the exterior contour of the support. The bend C of the tooth should be upon a radius such as to bring the end D into closer relation to the stem or main body part of the tooth B than the length of an exterior radius of support A—that is to say, before the tooth is applied or driven into place on the support A the distance between the points E' and F, Fig. 3, should be less than the distance between the points G H. Therefore when the end D is driven through the transverse openings in support A the bends E will snap over the exterior surface of the support, the natural resiliency of the tooth B at the bend C thereof permitting said bends to snap over the exterior surface of the support, the curves or depressions of the bends or corrugations E conforming to the exterior surface of the support and forming a lock for the harrow-tooth to efficiently hold the same in position and preventing the tooth from jarring or working loose without the necessity of employing nuts or other securing or fastening devices for securing the tooth to the support.

It is obvious that instead of driving the bent portion D of the tooth through the transverse openings of support A the main stem B' of the tooth may be driven through the transverse opening of support A, and the bent end D' may be provided with the bends, grooves, or corrugations $E^2$, (see Fig. 2,) which bends, grooves, or corrugations snap over the exterior surface of the support A to form the lock therefor. The construction and arrangement shown in Fig. 3 are preferred, however, for the reason that in operation as a harrow, for instance, advantage may be taken of the resiliency afforded by the bend C, whereas in the construction shown in Fig. 2 the bend C' does not contribute to the resiliency of the tooth B' when in use, as will be evident.

From the foregoing description it will be seen that I provide an exceedingly simple and efficient support for the tooth, the tooth being locked in position by its own resiliency, but without the necessity for any securing nuts or bolts, while at the same time the tooth may be readily removed from its holder or support. It will also be seen that broken or injured teeth may be readily removed from the holder and replaced, and when a tooth is once inserted in place in the support or holder it is efficiently gripped or clamped. It will also be seen that I provide an exceedingly inexpensive support or construction for harrow-teeth.

It is obvious that the principles of my invention are readily applicable to many different purposes and uses—as, for instance, for supporting harrow-teeth, rake-teeth, cultivators, rake-cleaners, spring fingers or rods, or other forms of tools or implements.

I have described my invention as applied to a harrow, and in Fig. 1 I have shown the application thereof to a harrow; but it is obvious that my invention is not to be limited to such use, and I do not desire to be confined thereto.

In the construction of harrows shown a framework is provided and which consists of the side bars J K, in which the ends of the supports A are journaled, each support A carrying the desired number of harrow-teeth B. A bar L may be suitably connected to each of the supports A, and which bar may be manipulated in any suitable or convenient manner—as, for instance, through a hand-lever M—to secure the desired axial coincident adjustment of the supports A.

I desire it to be understood that my invention is not to be limited or restricted to the particular construction or arrangement of frame or supporting-bar for the teeth or spring-fingers, nor to the means for rotatably adjusting the supports. It is also to be understood, as above indicated, that the particular form of support A is unimportant. A tubular or pipe section, however, affords a most efficient support by reason of its lightness and which does not sacrifice anything of strength or rigidity, and a harrow or other implement or tool embodying the construction above set forth is meritoriously economical in construction and efficient in operation.

Many variations and changes in the details of construction and arrangement would readily occur to persons skilled in the art and still fall within the spirit and scope of my invention. I do not desire, therefore, to be limited or restricted to the exact details shown and described; but, Having now set forth the object and nature of my invention and constructions embodying the principles thereof, what I claim as new and useful and of my own invention, and desire to secure by Letters Patent of the United States, is—

1. The combination with a harrow-tooth bar, of a harrow-tooth having one end thereof bent back into substantially parallel relation with the stem of said tooth, one of these parts being rigidly secured to said bar, and the other of said parts having corrugations arranged to engage the bar exteriorly to lock the tooth in place, as and for the purpose set forth.

2. The combination with a harrow-tooth bar having transverse openings therethrough, of a harrow-tooth having a body portion and a bent end portion, one of said portions being inserted through an opening in said bar, and the other of said portions provided with corrugations arranged to snap over the exterior surface of said bar to lock said tooth, as and for the purpose set forth.

3. The combination with a harrow-tooth bar, of a harrow-tooth having an end portion bent back upon the body portion thereof and rigidly secured to said bar, said body portion having corrugations adapted to snap over the exterior surface of said bar to lock the tooth in place, as and for the purpose set forth.

4. The combination with a harrow-tooth bar, of a harrow-tooth provided with a shank and an end portion bent back into substantially parallel relation with respect to said shank, said bent end being rigidly connected to said bar, said shank provided with corrugations conforming to the exterior contour of said bar and arranged to yieldingly grip the exterior surface of said bar, as and for the purpose set forth.

5. The combination with a harrow-tooth bar, of a harrow-tooth provided with a shank and an end portion bent back into substantially parallel relation with the shank, said end portion being received and rigidly held by said bar, said shank portion for a portion of the length thereof provided with corrugations conforming to the exterior shape of the bar and adapted to snap thereover to form a yielding lock for said harrow-tooth, as and for the purpose set forth.

6. A harrow-tooth having a shank portion and an end portion bent into substantially parallel relation with respect to each other, one of said portions provided with a corrugation, as and for the purpose set forth.

In witness whereof I have hereunto set my hand, this 17th day of April, 1901, in the presence of the subscribing witnesses.

JAMES MACPHAIL.

Witnesses:
E. C. SEMPLE,
S. E. DARBY.